Sept. 20, 1966 A. W. SCHULTZ 3,273,682
SEAL FOR FLUID OPERATED CLUTCH
Filed July 10, 1964 3 Sheets-Sheet 1

INVENTOR
ALFRED W. SCHULTZ
BY Williams, David,
Hoffmann & Yount
ATTORNEYS

Sept. 20, 1966     A. W. SCHULTZ     3,273,682
SEAL FOR FLUID OPERATED CLUTCH

Filed July 10, 1964     3 Sheets-Sheet 2

INVENTOR.
ALFRED W. SCHULTZ
BY Williams, David,
Hoffmann & Yount
ATTORNEYS

Sept. 20, 1966   A. W. SCHULTZ   3,273,682
SEAL FOR FLUID OPERATED CLUTCH
Filed July 10, 1964   3 Sheets-Sheet 3
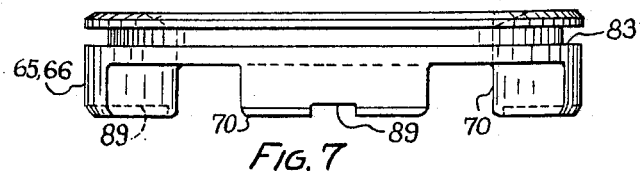
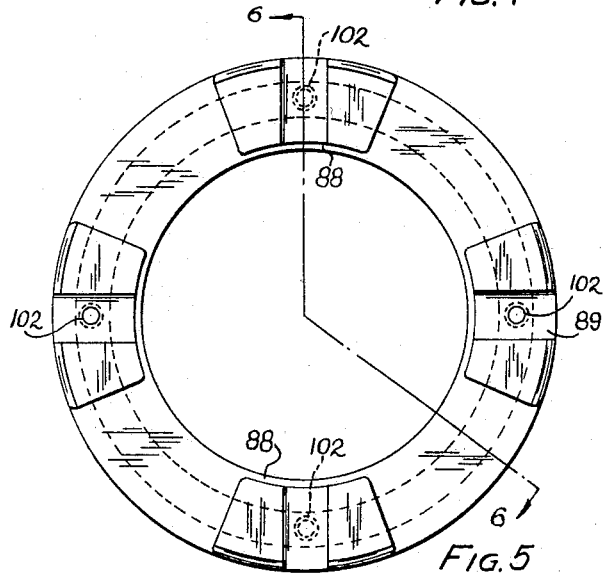
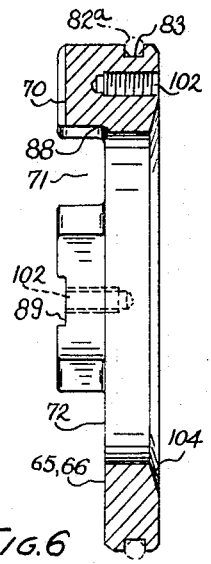
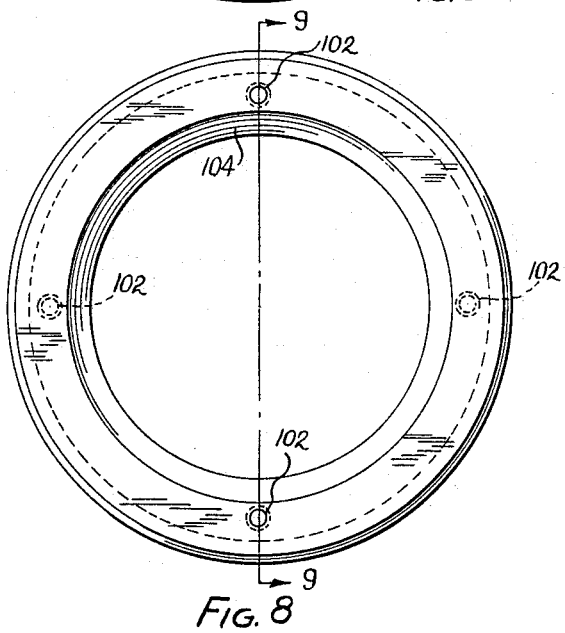
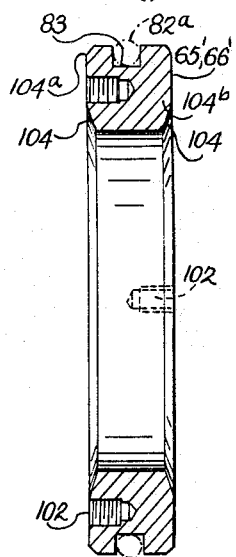
INVENTOR.
ALFRED W. SCHULTZ
BY Williams, David,
Hoffmann & Yount
ATTORNEYS United States Patent Office 3,273,682
Patented Sept. 20, 1966

3,273,682
SEAL FOR FLUID OPERATED CLUTCH
Alfred W. Schultz, Cleveland Heights, Ohio, assignor to The Cleveland Crane & Engineering Company, Wickliffe, Ohio, a corporation of Ohio
Filed July 10, 1964, Ser. No. 381,675
3 Claims. (Cl. 192—85)

The present invention relates to power presses and the like having a fluid operated clutch to intermittently drivingly connect a shaft of the press with a rotating drive member concentric with the shaft.

The principal object of the invention is the provision of a new and improved power press or the like having a fluid operated clutch for drivingly interconnecting a shaft of the press with a drive element rotatably supported on the shaft, the clutch including an expansible chamber type fluid motor comprising cylinder and piston members concentric with the shaft, and sealing means to prevent the escape of fluid between the cylinder and piston members and the shaft, the sealing means comprising a sealing member concentric with the shaft and in sealing engagement with one of the members of the shaft and being freely floating circumferentially and axially of the shaft, the sealing member having an axially tapered annular surface concentric with the shaft and engageable with a complementary surface on the shaft or one of the members to form a fluid seal therebetween upon the sealing member being moved axially of the shaft to engage the complementary surface by fluid introduced into the chamber for actuating the clutch, the tapered annular surfaces having a taper such that the force exerted therebetween upon engagement will have a radial component substantially less than the axial component whereby sticking between the two surfaces is obviated and wear therebetween is held to a minimum.

Another object of the invention is the provision of a new and improved press of the character referred to including an expansible chamber fluid motor for actuating the clutch comprising cylinder and piston members concentric with the shaft and pressure fluid supply means for actuating the fluid motor, and fluid sealing means between the shaft and the piston and cylinder members including annular freely floating sealing members sealingly engaged with the piston and cylinder members, respectively, and which sealing members are independently movable in opposite directions relative to the shaft to engage and disengage spaced annular abutments on the shaft, the sealing members and the abutments having cooperating annular tapered surfaces having an axial taper angle of about 78° and the sealing members having surfaces subjected to fluid pressure entering the fluid motor whereby the pressure of the fluid moves the sealing members into sealing engagement with the respective abutments on the shaft.

A further object of the present invention is to provide a new and improved sealing means for providing a fluid seal between an input shaft for a press or the like and a fluid operated clutch including an expansible chamber fluid motor comprising piston and cylinder members concentric with the shaft comprising at least one annular sealing member concentric with the shaft and in sealing engagement with one of the members or the shaft and being freely floating circumferentially and axially of the shaft, the sealing member having an axially tapered annular surface concentric with the shaft and engageable with a complementary surface on the shaft or one of the members to form a fluid seal therebetween upon the sealing member being moved axially of the shaft to engage the complementary surface by fluid introduced into the chamber for actuating the clutch, the tapered annular surfaces having a taper angle such that the force exerted therebetween upon engagement will have a radial component substantially less than the axial component whereby sticking between the two surfaces is obviated and wear therebetween is held to a minimum.

Yet another object of the invention is to provide a new and improved sealing means for providing a fluid seal between an input shaft for a press or the like and a fluid operated clutch including a fluid motor comprising piston and cylinder members concentric with the shaft comprising first and second annular sealing members concentric with the shaft and sealingly engaged with said cylinder and piston members, respectively, and independently movable in opposite directions relative to the shaft to engage and disengage spaced annular abutments on the shaft, the sealing members and the abutments having cooperating annular tapered surfaces having an axial taper angle of about 78° and the sealing members having surfaces subjected to fluid pressure entering the fluid motor whereby the pressure of the fluid moves the sealing members into sealing engagement with the respective abutments on the shaft.

The invention resides in certain details of constructions and combinations and arrangements of parts and further objects and advantages thereof will be apparent to those skilled in the art to which the invention relates from the following description of the presently preferred embodiment described with reference to the accompanying drawings forming a part of this specification in which similar reference characters designate corresponding parts, and in which:

FIG. 5 is a front elevational view, on an enlarged scale, of one of the movable annular sealing members forming a part of the punch press;

FIG. 6 is a sectional view of the sealing member of FIG. 5 taken substantially along line 6—6 thereof;

FIG. 7 is a top plan view of the annular sealing member of FIG. 6;

FIG. 8 is a side elevational view, on an enlarged scale, of one of a pair of alternate movable annular sealing members which may be substituted for the annular sealing members shown in FIGS. 4-7; and FIG. 9 is a sectional view of the sealing member of FIG. 8 taken substantially along line 9—9 thereof.

Figure 1:
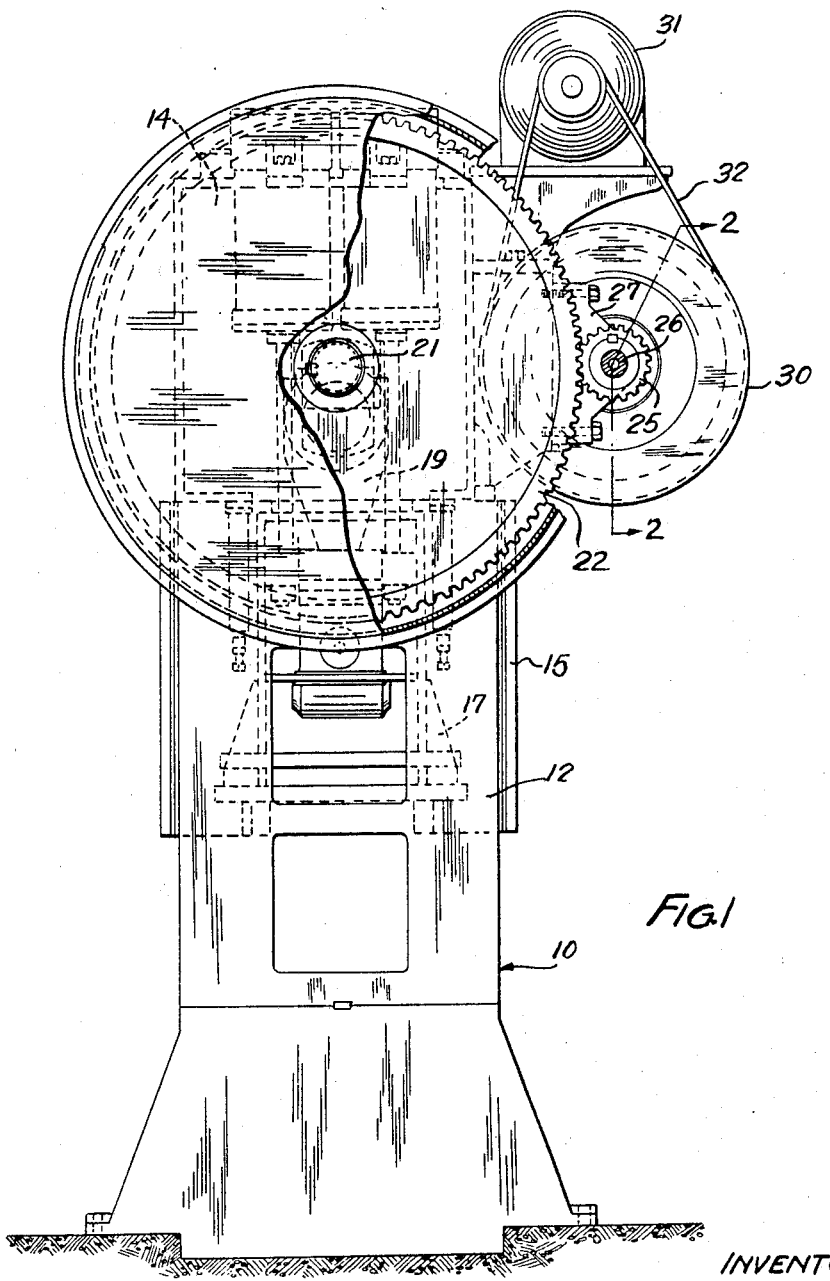
FIG. 1 is a side elevational view of the punch press showing certain parts thereof broken away.

Although the invention can be used in various mechanisms, it is particularly suitable for use in presses having intermittently reciprocable rams or punches, and for the purpose of illustration it is herein shown embodied in a punch press. The punch press comprises a frame 10 including a bed 11 having uprights 12 at opposite sides interconnected by a crown 14 at the tops thereof. The uprights 12 have guideways 15 attached thereto on their inner sides which guide a ram or punch 17 vertically. The ram 17 is reciprocated by a pair of spaced pitmans 19 which are attached to the cranks of a shaft 21 journalled in the crown. The crank shaft 21 is driven by two bull gears 22, only one of which is shown, attached to opposite ends thereof. The bull gears 22 are driven by pinions 25, only one of which is shown, which pinions are attached to the ends of a drive shaft 26 supported adjacent to its ends by two bearings 27, only one of which is shown, attached to the crown at opposite ends thereof. The drive shaft 26 carries a flywheel 30 intermediate the bearings 27, which flywheel is journalled thereon, preferably by suitable antifriction bearings 28, so that the flywheel freely rotates on the shaft. The flywheel is driven by an electric motor 31, supported on the upper part of the press frame, through drive belts 32.

The flywheel 30 is intermittently connected in driving relation with the shaft 26 by a fluid clutch indicated generally at C, which clutch comprises a cylinder 34 having a cylindrical chamber 35 and an end wall or head 36 which has a cylindrical opening 37 for passing the shaft 26 and which accommodates a portion of the sealing means later described in detail. The open end of the cylinder 34 has a radial flange 40 which is provided with a plurality of arcuate projections 41 which extend outwardly from the face of the flange and which have openings to receive bolts 42 by which the cylinder is attached to the side of the flywheel 30. The projections 41 are equally spaced about the cylinder 34 and they provide space for separating the cylinder proper from the flywheel to permit free circulation of air between the cylinder and the flywheel, and in addition, have inwardly facing teeth or splines 43, the purpose of which will appear hereinafter.

A clutch actuating piston 47 has a head end 48 reciprocable in the cylinder chamber 35 and the head end 48 of the piston has an axial opening 49 which receives the shaft 26 with clearance therebetween. The periphery of the head end 48 of the piston is undercut to receive a suitable piston ring 49 which may be of any suitable type and is here shown as a flexible ring U-shape in cross section. The outer end of the piston 47 has an annular ring formation 50 which presents a smooth annular surface 51 lying in a plane normal to the drive shaft 26, the purpose of which will appear as the description proceeds. The periphery of the ring portion 50 has teeth 52 which mesh with the teeth or splines 43 of the cylinder so that the piston 47 is rotated by the cylinder and movable axially relative to the cylinder.

The piston 47 is normally urged toward the end 36 of the cylinder chamber by a plurality of compression springs 54, only one of which appears in the drawings, which are seated in recesses in the outer end of the cylinder and which surround bolts 55 which extend through openings in the portion 50 of the piston and the flange 40 of the cylinder member. The bolt heads are recessed in the ring portion and the outer ends have nuts and washers 57 against which the springs 54 press to urge the bolts outwardly to draw the piston to the left, as viewed in FIG. 2.

Figures 2, 3, 4:
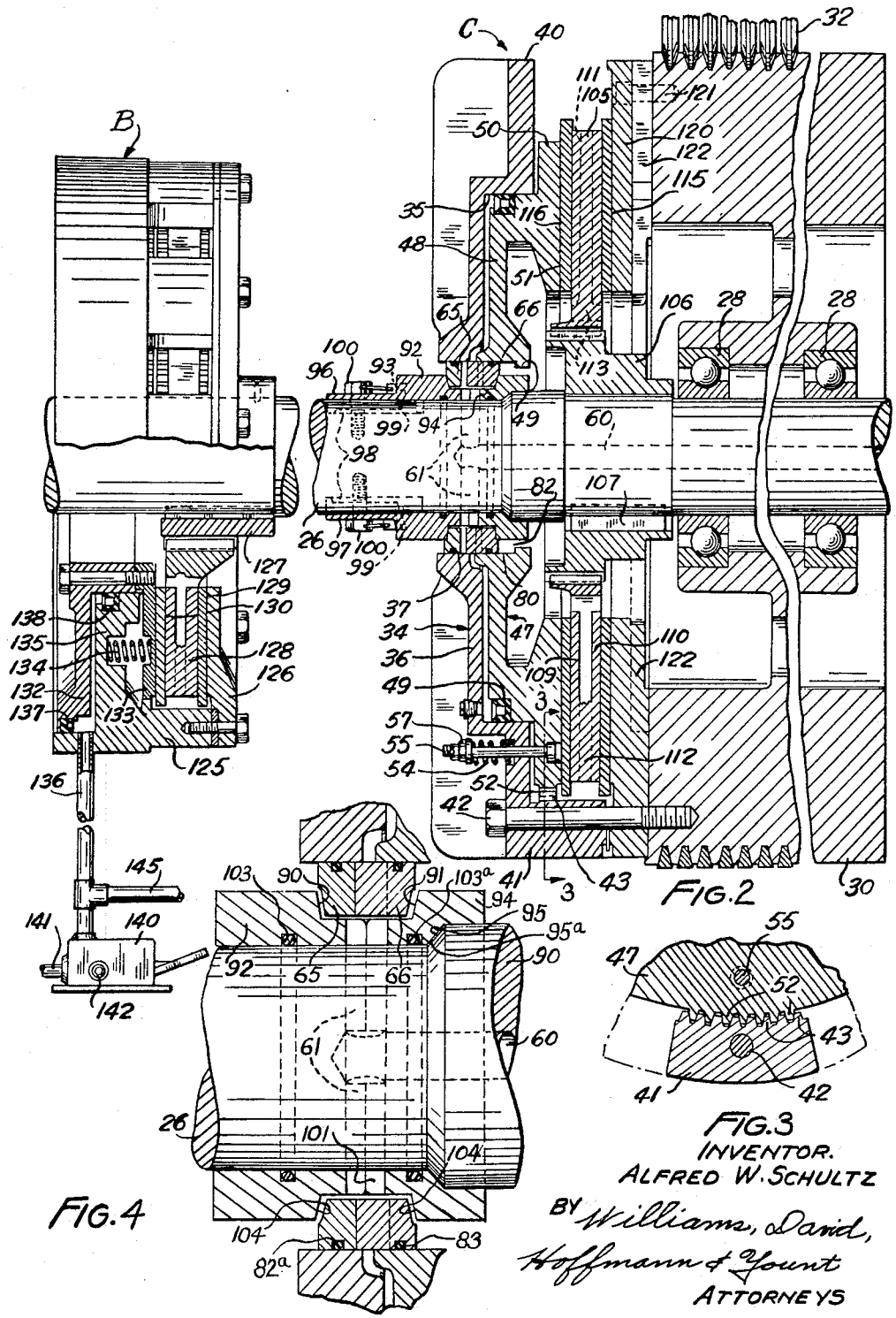
FIG. 2 is a fragmentary sectional view taken substantially along line 2—2 of FIG. 1, but on a larger scale.
FIG. 3 is a fragmentary sectional view taken substantially along line 3—3 of FIG. 2.
FIG. 4 is a fragmentary view, on an enlarged scale, of the mechanism shown in FIG. 2.

The piston 47 is forced to the right, as viewed in FIG. 2, to engage the clutch by fluid pressure, such as air, introduced into the cylinder 34. In the present form of press, the drive shaft 26 has an axial bore or aperture 60 which extends from one end thereof to a point opposite the area between the cylinder head and piston, and radial bores or apertures 61 extending from the axial bore to the circumference of the shaft and forming openings or outlets communicating with the cylinder chamber between the cylinder head 36 and the end 48 of the piston. In the present form of press, air is introduced into the passage 60 by suitable means, described more fully hereinafter, and the escape of the air from the chamber 35 along the shaft 26 between the shaft and the cylinder and piston respectively is prevented by a readily removable and replaceable sealing means.

The preferred form of sealing means comprises a pair of annular sealing rings or members 65 and 66 concentric with the shaft 26 and freely floatable thereabout, that is, movable both circumferentially and axially thereof. The sealing rings 65, 66, best illustrated in FIGS. 4–7, are preferably made of a composition material impregnated with lubricant and may be identical parts. Each is provided with a series of circumferentially spaced projections 70, herein illustrated as axially extending projections spaced approximately 90° apart. The projections 70 have spaces 71 therebetween and extend axially from the adjacent faces 72 of each ring, the spaces 71 of each ring being of a size to accommodate or receive in an interdigitated manner the projections 70 of the other of the rings. The projections 70 cooperate to permit axial movement of the rings 65 and 66 toward and away from one another while preventing relative rotational movement therebetween.

The sealing rings 65, 66 are received respectively in the opening 37 of the cylinder 34, and in an annular recess 80 of the piston 47. The opening 37 and the recess 80 form a working chamber 82 for the sealing means. The rings 65 and 66 which are free to rotate relative to the cylinder 34 and the piston 47 are maintained in sealing engagement or movable fluid-tight relation therewith by O-rings 82ᵃ disposed in grooves 83 of the rings.

When the ring members 65, 66 are in their normal position, they are engaged with one another as shown in FIG. 4, and are over the openings of the bores 61 in the shaft 26. The inner surfaces of the annular ring members adjacent to the central openings therethrough are relieved or stepped as shown at 88 to permit passage of air from the bores 61 into the cylinder and to cause the air to force the rings outwardly. In addition, radial grooves 89 are provided in the axially facing surfaces of the projections 70 of the annular members to permit passage of the air between the piston and cylinder head.

The shaft 26 has two annular valve or abutment surfaces or seats 90, 91 concentric therewith, facing toward one another and located outwardly of the rings 65, 66. The valve or abutment surface 90 is preferably formed on a sleeve or annular member 92 closely fitting the shaft but slidable to the left therealong, as viewed in FIG. 2. The inner end portion of the sleeve 92 has a reduced external diameter and is disposed between the sealing ring 65 and the shaft 26 and the outer end has a rim, the outer face of which is tapered to form a camming surface 93. The sleeve 92 has an axially tapered surface intermediate its ends which forms the abutment surface 90.

The annular valve surface or abutment 91 is also preferably formed on a sleeve or annular member 94 closely fitting the shaft 26 and slidable to the right therealong, as viewed in FIG. 2. The left or inner end portion of the sleeve 94 has a reduced external diameter and is disposed between the sealing ring 66 and the shaft 26. Movement of the sleeve 94 toward the right is limited by an annular shoulder 95 formed on the shaft which engages a complementary internal annular shoulder 95ᵃ formed within the right end portion of the sleeve 94, as viewed in FIG. 2. It will, of course, be understood that the right end of the sleeve 94, as viewed in FIGS. 2 and 4, could be made to abut a shoulder formed on the shaft 26, if desired. The sleeve 94 has an axially tapered surface intermediate its ends which forms the abutment surface 91.

The inner end of the sleeve 92 abuts the inner end of the sleeve 94 and holds the sleeve 94 against the shoulder 95. The sleeve 92 in turn is held in abutment with the sleeve 94 by two cam blocks 96, 97 disposed in recesses 98 in opposite sides of the shaft and having cams 99 which engage the surface 93 and cam the sleeve 92 to the inner end of the sleeve 94 when the blocks are forced into the recesses by screws 100 threaded into the side of shaft 26 and extending through the cam blocks. The adjacent inner ends of the sleeves 92 and 94 are provided with a plurality of circumferentially spaced notches or recesses 101 for the purpose of communicating the air supply passages 61 with the cylinder chamber formed between the cylinder 34 and the piston 47. The sleeve 92 serves to retain the sealing members 65, 66 within the working chamber formed by the opening 37 and the recess 80 and by the arrangement shown the sleeve 92 can be moved along the shaft 26 to permit access to and removal or replacement of the ring members 65, 66. To facilitate handling of the ring members 65, 66, threaded openings 102 on both axially facing sides thereof are provided in which screws may be inserted to serve as handles for inserting the ring members into the working chamber 82 or withdrawing them therefrom. The provision of the openings 102 on both sides of the ring members 65, 66 enables them to be removed regardless of which side thereof faces toward the annular member 92.

The sleeves 92 and 94 are preferably provided with an annular internal groove or grooves 103 and 103a, respectively, in which conventional O-rings are disposed for the purpose of providing air tight seals between the sleeves 92 and 94 and the shaft 26.

The ring members 65, 66 have relatively close clearance with the reduced diameter portions of the sleeves 92 and 94 so that the introduction of air between the rings causes them to be forced apart, as shown in FIG. 2.

The annular members 65, 66 each has an annular valve surface or face 104 formed thereon which engages the annular abutment surfaces or faces 90, 91, respectively, when the members are moved apart to the positions shown in FIG. 2 and form air tight seals therewith. Since the piston 47 is moved to the right by air pressure in the cylinder to actuate the clutch to drivingly connect the flywheel 30 to the shaft 26, the members 65, 66 will rotate with the surfaces or abutments 90, 91 during the time they are in sealing engagement therewith. When the clutch is released by exhausting the cylinder chamber 35, the members 65, 66 move from their respective abutments so that they then float free of the shaft 26 and the surfaces 90, 91. Sliding friction is thus eliminated between the sealing surfaces during relative rotation between the cylinder 34 and piston 45 which always rotate as a unit and the shaft 26 thereby providing a highly efficient and long lasting seal. In effect the members 65, 66 are in the nature of movable valve elements which are moved, upon introduction of fluid pressure into the cylinder, from an open position into engagement with valve seat surfaces 90, 91 of stationary valve elements to prevent the flow of pressure fluid between the surfaces 104 of the movable valve elements 65, 66 and the surfaces 90, 91 on the stationary valve element.

An important characteristic of the sealing means is that the annular abutment faces or surfaces 90 and 91 are axially tapered, that is, tapered with respect to the axis of the shaft, with the taper angle thereof being a large acute angle preferably about 78°. Likewise, the annular surfaces or faces 104 are also axially tapered and have a taper angle corresponding to the taper angle of the surfaces 90, 91. By providing tapered sealing surfaces having a large taper angle of about 78°, no sticking between the surfaces 90, 91 and 104 occurs and wear therebetween is minimized, since the radial component of the force exerted between the surfaces during sealing engagement will be substantially less than the axial component. Moreover, by providing a large taper angle, the rings 65, 66 will immediately move toward each other and out of engagement with the abutment surfaces 90, 91 when the supply of pressure fluid to the chamber 35 is exhausted or cut-off.

FIGS. 8 and 9 show an alternate type or form of sealing rings 65', 66' which may be employed in place of the sealing rings 65, 66. The sealing rings 65', 66' are similar to the sealing rings 65, 66 except that they are not provided with any axially extending projections, but are annular rings provided with generally flat axially facing side surfaces 104a and 104b. The rings 65', 66' are also freely floatable about the shaft, that is, movable both circumferentially and axially thereof, and are freely floatable in a circumferential direction relative to each other. When the rings 65', 66' are employed and moved into sealing contact with the surfaces 90, 91, respectively, the axial distance between the adjacent side surfaces thereof will permit passage of the air from the passages 61 to the cylinder chamber formed between the cylinder 34 and the piston 47.

The reciprocation of the piston 47 by air pressure in the cylinder actuates suitable clutching members to clutch the flywheel with the shaft 26, and in the form shown, the clutch includes a center clutch plate 105, having a toothed axial opening supported on a splined hub 106 keyed to a shaft 26 by a key 107. The teeth of the plate 105 mesh with the splines of the hub so that the plate rotates the shaft 26 through the hub and can move axially thereof. The clutch plate 105 is preferably formed of two spaced annular walls 109, 110 which present smooth outer surfaces and which are separated by radial webs 111, 112 alternately spaced about the plate and the webs 111 extending from the hub to the outer edge of the plate and the webs 112 extending from the periphery of the plate and terminating approximately mid-way between the periphery and hub of the plate. The plate walls 109, 110 have openings 113 intermediate the webs 111 providing for the circulation of air from the hub of the plate outwardly between the walls and webs 111, 112 to maintain the plate relatively cool.

A pair of suitable clutch disks 115, 116 are on opposite sides of the clutch plate 105 and are preferably formed of annular flat rings having suitable composition facing on opposite sides and freely floating with respect to the shaft 26. The clutch disks are preferably split so that they are in segments which can be removed and replaced from the sides of the shaft 26 when the cylinder 34 is detached and moved from the flywheel along the shaft 26.

The clutch disk 115 abuts a flat ring shaped member 120 which is bolted to the side of the flywheel 30 by bolts 121, only one of which appears in the drawings, and the side of the plate 120 facing the flywheel has a series of radial impeller blades 122 formed thereon which causes air to circulate between the flywheel and plate 120 and carry away heat generated by operation of the clutch.

The clutch disk 116 is engaged by the surface 51 of the piston 47 and when the piston is actuated by fluid pressure, as described hereinbefore, the force of the piston causes the clutch disks 115, 116 to frictionally grip the clutch plate 104 and thereby drive the shaft 26.

Preferably, a fluid pressure released brake B is provided to brake the drive shaft 26 when the clutch C is disengaged. A brake of any suitable construction may be employed, and in the form shown comprises an annular cylinder member 125 concentric with shaft 26 and having an end plate 126. A hub 127 is attached to the shaft 26 and extends into the cylinder member 125 and a brake plate 128, which is preferably similar in construction to the center clutch plate described hereinbefore, is splined to the hub and is adapted to move axially relative to the shaft 26 while rotating therewith. Two annular friction disks 129, 130 are disposed on opposite sides of the brake plate 128 and are freely floatable with respect to the hub 127. The friction disks 129, 130 are preferably split so that the segments thereof could be removed and replaced from the sides of the shaft 26. The friction disk 130 is normally pressed against the adjacent face of the brake plate 128 and in turn urges the plate into frictional engagement with friction disk 129 by an annular piston member 132 having a flange 133 which engages the friction disk 130, and the piston is urged against the friction disk by a plurality of springs 134 interposed between the flange 133 of the piston and an annular wall 135 projecting inwardly from the periphery of the cylinder member 125. The piston member 132 is adapted to be moved to the left, as viewed in FIG. 3, and release the brake plate 128 from frictional engagement with the friction disks 129, 130, by air pressure entering the cylinder through a pipe 136 into the area between the piston and the wall 135 of the cylinder member. Preferably, the piston 132 is undercut about the periphery thereof to provide a seat for a ring seal 137 which prevents escape of air from between the piston and cylinder. The inner annular portion of the wall 135 is also undercut to accommodate a ring seal 138 between the web and the central portion of the piston.

The pipe 136 is connected with a treadle operated fluid valve 140 which is accessible to the operator of the press, and the inlet of which is connected by a pipe 141 with a suitable source of fluid pressure, not shown. Normally, the valve 140 is in a position to exhaust pipe 136 to a sump or the atmosphere through port 142, and when the treadle is depressed the valve is operated to connect pipe 136 with the fluid pressure supply through pipe 141. A pipe 145 is connected at one end to pipe 136 and the opposite end is connected to the end of shaft 26 and with the bore 60 through a suitable rotary seal mechanism, not shown.

Upon depressing the treadle of the valve 140, fluid pressure is supplied to the clutch C to drivingly connect the flywheel 30 with the shaft 26 and at the same time fluid pressure is supplied to the brake B to release the shaft 26. When the treadle valve 140 is released the clutch and brake are exhausted, causing the clutch to disengage the flywheel from shaft 26 and springs 134 to apply a braking force to the shaft 26 by pressing flange 133 against the friction disk 129, as described.

While in the preferred embodiment of the invention, the annular abutment surfaces 90, 91 are formed on sleeves which are secured to the shaft, it will of course be understood that the abutment surfaces could be formed integral with the shaft, if desired.

It will be apparent that the advantages enumerated as well as others have been attained and that there is provided a new and improved press mechanism and fluid operated clutch having reliable non-wearing sealing means which is positive in action and provides low cost construction and maintenance. The sealing means can be conveniently disassembled to permit removal of the cylinder 34 from the flywheel to gain access to the clutch friction disks for replacement, etc.

While the preferred form of the invention has been described in considerable detail, it will be apparent that the invention is not limited to the constructions shown and it is my intention to cover hereby all adaptations, modifications and changes therein which come within the practice of those skilled in the art to which the invention relates and the scope of the appended claims.

Having thus described my invention, I claim:

1. A sealing means for providing a fluid seal between radially spaced members, one of which is a shaft and the other an expansible chamber fluid motor having cylinder and piston members concentric with said shaft when fluid is directed into said fluid motor comprising first and second spaced annular abutment means on one of said members and having annular axially tapered surfaces, first and second annular sealing rings sealingly engaged with the other of said radially spaced members and concentric with and being freely floating axially and circumferentially relative to each of said members and being independently movable axially relative to each other, said sealing rings having axially tapered annular surfaces concentric with said members and corresponding to the tapered surfaces of said first and second abutment means and being engageable therewith to form a fluid seal therebetween when said first and second freely floating rings are moved axially relative to said members and into engagement with said first and second abutment means, respectively, by fluid directed into said fluid motor, said annular engageable surfaces having a large taper angle and when engaged effecting a radial force component which is substantially less than the axial force component.

2. In a press or the like, a shaft adapted to actuate the press, a rotary drive element rotatably supported on said shaft, fluid operated clutch means to drivingly connect the shaft to said drive element including fluid motor means comprising cylinder and piston members concentric with said shaft, means to direct fluid into said fluid motor means, first and second annular abutment means having axially tapered surfaces concentric and rotatable with said shaft, first and second annular sealing members in sealing engagement with said cylinder and piston members, respectively, and concentric with said shaft, said first and second sealing members being freely movable circumferentially and axially relative to said shaft and their respective cylinder and piston members and being independently axially movable relative to each other, said sealing members having axially tapered annular surfaces complementary with the tapered surfaces of said abutment means, said sealing members being movable toward and away from one another into and out of engagement with said abutment means, said axially tapered surfaces of said abutment means and said sealing members having a large taper angle for effecting a radial force component which is substantially less than the axial force component when said first and second members are forced apart and into sealing engagement with said abutment means by fluid directed into said fluid motor means.

3. In a press or the like, as defined in claim 2, and wherein said annular axially tapered surfaces of said sealing members and said abutment means have a taper angle of about 78°.

References Cited by the Examiner

UNITED STATES PATENTS 2,037,144 4/1936 Olson.
2,981,391 4/1961 Schultz _____ 192—85

DAVID J. WILLIAMOWSKY, *Primary Examiner.*

DON A. WAITE, *Examiner.*

B. W. WYCHE, III, *Assistant Examiner.*